United States Patent
Broadhurst

(10) Patent No.: US 11,453,840 B2
(45) Date of Patent: Sep. 27, 2022

(54) METHOD FOR APPLYING ENERGY TO CANNABIDIOL

(71) Applicant: John Anton Broadhurst, Lewis, DE (US)

(72) Inventor: John Anton Broadhurst, Lewis, DE (US)

( * ) Notice: Subject to any disclaimer, the term of this patent is extended or adjusted under 35 U.S.C. 154(b) by 627 days.

(21) Appl. No.: 16/396,596

(22) Filed: Apr. 26, 2019

(65) Prior Publication Data

US 2019/0330560 A1 Oct. 31, 2019

Related U.S. Application Data

(60) Provisional application No. 62/664,156, filed on Apr. 28, 2018.

(51) Int. Cl.
| | | |
|---|---|---|
| *C11B 3/00* | (2006.01) | |
| *C11B 3/16* | (2006.01) | |
| *C11B 1/10* | (2006.01) | |
| *B23K 26/06* | (2014.01) | |

(52) U.S. Cl.
CPC ............. *C11B 3/001* (2013.01); *C11B 3/005* (2013.01); *C11B 3/008* (2013.01); *C11B 3/16* (2013.01); *B23K 26/0648* (2013.01); *C11B 1/104* (2013.01)

(58) Field of Classification Search
CPC ......... C11B 3/001; C11B 3/005; C11B 3/008; C11B 3/16; C11B 1/104; C11B 1/10; B23K 26/0648
USPC .................................................... 204/167.63
See application file for complete search history.

(56) References Cited

U.S. PATENT DOCUMENTS

| | | | | |
|---|---|---|---|---|
| 2009/0131376 A1* | 5/2009 | Ovokaitys | .............. | A61K 31/40 514/165 |
| 2011/0143000 A1* | 6/2011 | Fiset | ...................... | C12H 1/165 426/248 |
| 2018/0042845 A1* | 2/2018 | Sinai | .................... | A61K 31/352 |
| 2018/0127327 A1* | 5/2018 | Ovokaitys | ................ | C05D 1/00 |
| 2019/0015383 A1* | 1/2019 | Woelfel | ................. | A61K 31/05 |

OTHER PUBLICATIONS

Koviacic et al, "Cannabinoids (CBD, CBDHQ and THC): Metabolism, Physiological Effects, Electron Transfer, Reactive Oxygen Species and Medical Use," The Natural Products Journal, 2014 vol. 4, pp. 47-53. (Year: 2004).*

* cited by examiner

*Primary Examiner* — Nicholas A Smith
(74) *Attorney, Agent, or Firm* — Gleam Law, PLLC; Neil Juneja

(57) ABSTRACT

A method of applying energy to CBD oil is provided. The method may include obtaining CBD oil from a plant, combining the CBD oil with a carrier oil, heating the combination of the CBD oil and carrier oil, mixing the CBD oil and carrier oil, filtering the CBD oil and carrier oil to a size of less than 60 nanometers, and applying an energy field to the CBD oil and carrier oil through a laser effector such that an electron is promoted from a bonding or non-bonding orbital into an empty anti-bonding orbitals of the CBD molecule. The laser effector may be a pink sapphire cut into a 15 equal side faceted crystal, double-stacked in a 2.3 cm cylindrical chamber, or an opulence half dome bubble lens configured to refract the beam.

15 Claims, 3 Drawing Sheets

METHOD FOR APPLYING ENERGY TO CANNABIDIOL

BACKGROUND

The present disclosure is related to methods for applying energy to cannabidiol, hereinafter CBD, to enhance efficacy. CBD is a chemical compound found in genus *Cannabis* that has been linked to many potential medical uses but has no psychoactive effect on humans, as opposed to tetrahydrocannabinol (THC), another chemical compound found in genotypes of *Cannabis*. CBD oil is in high demand for its ability to treat children with epileptic seizures. CBD oil also has promising results in treating diseases and disorders such as inflammation, pain, anxiety, secures, spasms, depression, epilepsy, arthritis, multiple sclerosis, psoriasis, post-traumatic stress disorder, dementia, schizophrenia, osteoporosis, and Lou Gehrig's disease.

To produce CBD oil, typically a harvest is made from a high-CBD, low-THC plant. The plants with high concentrations of CBD are harvested and the CBD oil is extracted from the stalks, seeds, flowers, and leaves of the plant. Many CBD oil varieties are extracted from hemp, because CBD commonly dominates the plant's makeup. Often, an extraction solvent is used to collect the essential oils and compounds from the hemp plant. In one example, a producer of CBD oil would use a supercritical carbon dioxide ($CO_2$) process. Most CBD oil products then undergo decarboxylation to transform the CBD oil into a form that interacts with the endocannabinoid system of the human body. The CBD oil is then either consumed directly, or used with a product such as a capsule, tincture, liquid, body care products, topical creams, eardrops, intra-muscular products, etc.

Current products claiming to be pure CBD generally use a CBD isolate or powder. These products essentially combine the powder with cherry juice for sublingual use, propylene glycol and/or vegetable glycerin for vaporizer fluid, and other carriers, such as shampoo and soap for topical use. After research on current CBD manufacturing companies, bioavailability is the biggest obstacle.

The preparation methods of the CBD oil influences the efficiency by which the CBD oil interacts with the human body. CBD oil produced by certain methods may increase the potency and efficacy of the compound, meaning that the product can be distributed to a greater number of people and the dosage has increased control. Therefore, a need exists for a method to enhance the efficacy of CBD oil.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a method for applying energy to cannabidiol is provided. The method generally includes obtaining CBD oil from a plant, combining the CBD oil with a carrier oil, heating the combination of the CBD oil and carrier oil, mixing the CBD oil and carrier oil, filtering the CBD oil and carrier oil to a size of less than 60 nanometers, and applying an energy field to the CBD oil and carrier oil through a laser effector such that an electron is promoted from a bonding or non-bonding orbital into an empty anti-bonding orbitals of the CBD molecule.

In accordance with one embodiment of the present disclosure, a method for applying energy to cannabidiol is provided. The method generally includes obtaining CBD oil from a plant; combining the CBD oil with a carrier oil to produce a combination oil; heating the combination of the combination oil on a hot plate mixer to about 275° F. for about 45 minutes; reducing the heat of the combination oil to about 225° F. for about 8 minutes; reducing the heat of the combination oil to about 170° F. for about 6 minutes; reducing the heat of the combination oil to about 155° F. for about 45 minutes; mixing the combination oil for about 108 minutes; gradually heating the combination oil to about 275° F. and placing the combination oil in a sonicator for about 45 minutes; filtering the combination oil from about 800 nm to about 650 nm; placing the combination oil in a rotorecumbler homogenizer for about 45 minutes; applying an energy field of 12 V at about 44.1 Hz for a rapid discharge of about 12 seconds; filtering the combination oil from about 650 nm to about 110 nm; and applying a pulse generated photon laser lumen beam through a multiphase oscillator and through a laser effector such that an electron is promoted from a bonding or non-bonding orbital into an empty anti-bonding orbitals of the CBD molecule.

In accordance with any of the embodiments described herein, the step of mixing the CBD oil and carrier oil may be performed for about 108 minutes.

In accordance with any of the embodiments described herein, the CBD oil and carrier oil may be heated to about 275° F. for about 45 minutes.

In accordance with any of the embodiments described herein, after the step of mixing, the CBD oil and carrier oil may be placed in a sonicator for about 45 minutes.

In accordance with any of the embodiments described herein, the CBD oil and carrier oil may be filtered to about 110 nm.

In accordance with any of the embodiments described herein, the CBD oil and carrier oil may be filtered to about 44.1 nm.

In accordance with any of the embodiments described herein, the energy field may be 12 V at about 44.1 Hz for rapid discharge of about 12 seconds at 12 second intervals.

In accordance with any of the embodiments described herein, the energy field may be 12 V at about 24.1 Hz for rapid discharge of about 15 seconds at 15 second intervals.

In accordance with any of the embodiments described herein, the step of applying the laser beam to the CBD oil and carrier oil may include applying a pulse generated photon laser lumen beam through a multiphase oscillator and through the laser effector.

In accordance with any of the embodiments described herein, the laser effector may be a pink sapphire cut into a 15 equal side faceted crystal, double-stacked in a 2.3 cm cylindrical chamber.

In accordance with any of the embodiments described herein, the laser effector may be an opulence half dome bubble lens configured to refract the beam.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Figure 1:
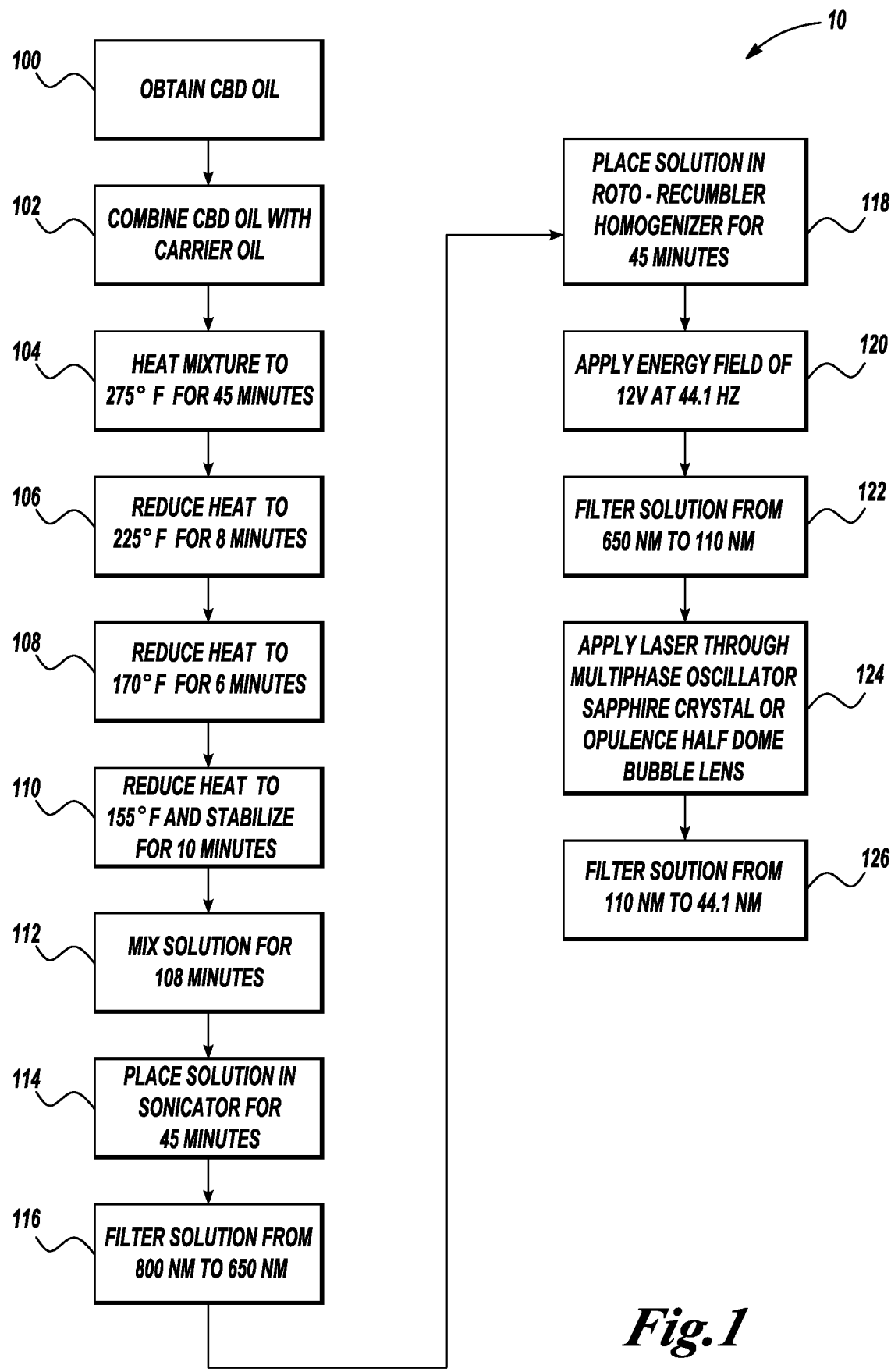
FIG. 1 is a flowchart of a representative embodiment of a CBD oil preparation method in accordance with one or more aspects of the present disclosure.

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

Described herein, embodiments of the present disclosure are generally related to the preparation of CBD oil for use with the human body. The CBD oil is extracted from the plant, such as hemp, using any suitable method. The methods disclosed herein apply energy of various types to the CBD oil to enhance its efficacy and potency. In some embodiments a directed vibration is applied to the CBD oil. In other embodiments, one or more of light waves, electrical energy, thermal energy, and other energy is applied to the CBD oil. Examples herein may include one or all of the energy applications to the CBD oil to produce the products, such as capsule, tincture, liquid, body care products, topical creams, eardrops, inter-muscular products, etc.

The term molecule is often used in reference to CBD isolate and may reference the particle size herein.

Using the methods disclosed herein, CBD oil with greater efficacy for optimal bioavailability to the endocannabinoid system of the human body may be produced. Conventional CBD products include a single-molecule isolate that is placed in carrier oil. As such, the size and delivery options for conventional CBD oil are limited.

Using the methods disclosed here, the size of the molecule of CBD is processed to be smaller than the size of the molecule of CBD in conventional CBD products. In some embodiments, the molecule size is on the order of one nanometer (nm, $1 \times 10^{-9}$ m), which may increase the human body's ability to absorb and process the CBD. In other embodiments, the molecule size is tailored to the most effective size for optimal bioavailability.

Nanoparticles generally have enhanced absorption and high uptake efficiency in target cells of the human body. In this regard, nanoparticles have access to portions of the human body not accessible to conventional sized particles. In one example, nanoparticles are configured for rapid absorption from gastrointestinal (GI) tract. In other examples, nanoparticles are protected from premature degradation in body. As created using the methods of the present disclosure, CBD nanoparticles are configured to cross the blood brain barrier on the order of less than 60 nm in size.

The methods disclosed herein may utilize a variety of commercially available laboratory equipment, such as, but not limited to:

Biochemistry Analyzer
Gravity Convention Utility Oven
Scientific 121193 Orbital Shaker
American Optimal Micro star Microscope
Magnetic Hot-Plate Stirrer
U-V Lighting
Magnetizer
Polarization Unit
Air Shower Clean Room Having 8×20 CO2 FRP/Clean Room R-13 Insulation
Class B Biological Safety Cabinet
Oxygen Generator
Multi-Spectrum Oscillator
Flex Mod
Stainless Steel Sink w/Plumbing installation
C1D1 Duplex 250 v Receptacle
10 L Whole Plant Hemp extracted by CO2
100 L MCT oil or equivalent carrier oil (e.g., grapeseed oil)
Homogenizer/Sonicator Referring initially to FIG. 1, a method 10 for applying energy to CBD oil is shown. In some embodiments, the method is used to reduce the particle size to about 44.1 nm and increase efficacy in absorption in the human body. The method 10 generally includes obtaining CBD oil at block 100. At block 102, the CBD is then combined with 1L of carrier oil into a 1L narrow chamber flask (not shown). In one example, 1L of carrier oil is mixed with 30 mL of industrial hemp oil into the narrow chamber flask. In other embodiments any suitable size of flask is used with a suitable quantity of carrier oil depending on the quantity of CBD oil being processed. In embodiments producing larger quantities of CBD oil, various components of the following disclosure may be suitably enlarged.

In some embodiments, organic full spectrum hemp oil is combined with pharmaceutical grade MCT oil as a carrier.

Cannabidiol acts on cannabinoid receptors in cells and can alter neurotransmission and inflammation. In some embodiments, a $CO_2$ supercritical fluid extractor is used for the extraction process. The use of full spectrum CBD oil allows access to different varieties of cannabinoid. The carrier oils and base oil may be different in some embodiments. For example, instead of MCT oil for a carrier and CBD crude oil for base, a grapeseed oil and CBD distillate are suitably used. In other embodiments, the CBD oil mixture may also incorporate other essential oils and herbal extracts, while retaining the same methods disclosed herein.

Next, at block 104, the narrow chamber flask is placed onto a magnetic hot plate mixer (not shown) while the temperature is gradually raised to about 275° F. and held for about 45 minutes. Then, at block 106, the heat is reduced to about 225° F. for about 8 minutes. Next, at block 108, the heat is reduced to about 170° F. for 6 minutes. At block 110, the heat is then reduced to about 155° F. and stabilized for about 45 minutes in oil concentration to produce between about 10-80 milligrams (mg) of CBD per mL of carrier oil.

Although certain time durations may be used herein, in other embodiments, other time durations are within the scope of the present disclosure, such as, for example, shortening the duration of the homogenizing step to refrain from breaking the particles down farther, or increasing the duration with frequencies to break down the particles beyond the sizes described herein. Likewise, if a difference quantity of CBD oil is being processed, certain time durations may increase or decrease to properly process the CBD oil.

Next, at block 112, the solution is gradually added to a magnetic mixer (not shown) and mixed at about 500-1500 rpm for about 108 minutes.

Figure 2:
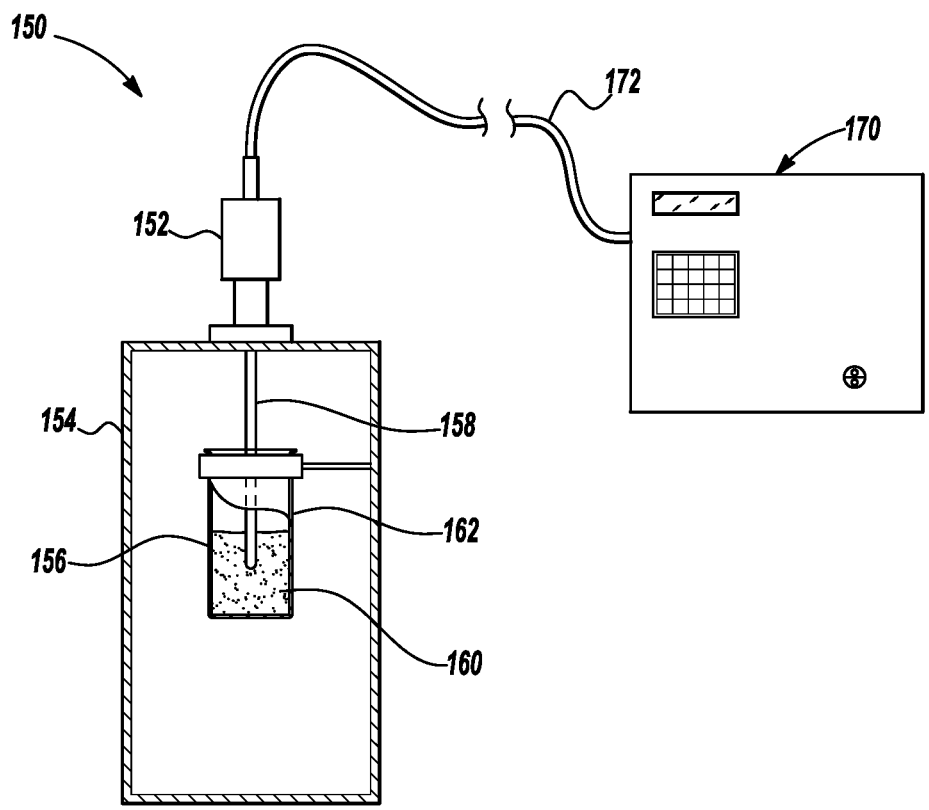
FIG. 2 is a view of a representative embodiment of a sonicator and homogenizer with a formula from block 114 to block 118 of FIG. 1.

After mixing, at block 114, and referring to FIG. 2, the flask is removed and placed on a table top sonicator 150 for about 45 minutes. As shown, the sonicator 150 includes a sonicator probe 152, an enclosure 154, a flask 156, a probe rod 158, the CBD oil mixture 160, a control unit 170, and a connector cable 172 to provide electrical communication between the control unit 170 and the sonicator probe 152. As shown, the probe rod 158 travels through the buffer area 162 into the CBD oil mixture 160.

Figure 3:
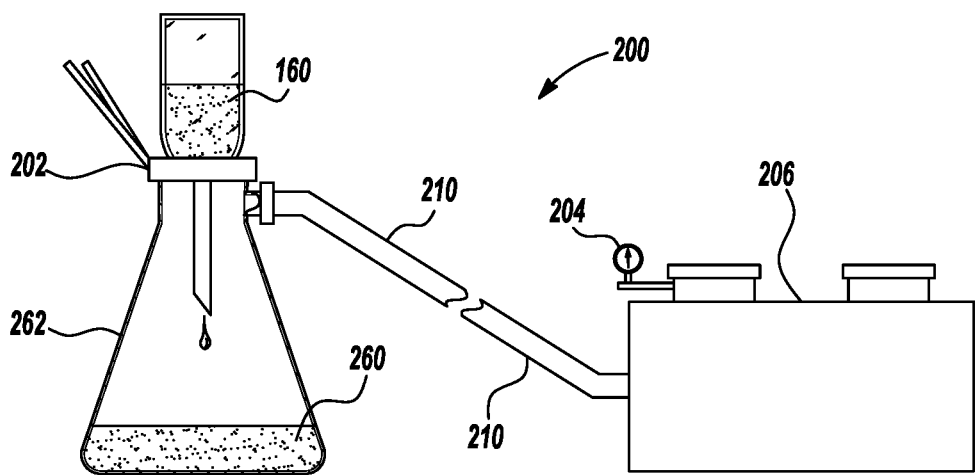
FIG. 3 is a view of a representative embodiment of a filtration system of blocks 122 and 126 of FIG. 1.

Next, at block 116, and referring to FIG. 3, the mixed solution is poured through a series of stainless steel filters of a filtration system 200 in the range of 800 nm, then 700 nm, then 650 nm to filter out particles larger than the filter size. The filtration system 200 includes one or more nanofilters 202 at the opening of a flask 262 configured for connection to a vacuum tube 210 for pulling vacuum on the flask 262. In this regard, the CBD oil mixture 160 is pulled through the nanofilters 202 and into the flask 262 using vacuum from a vacuum pump 206 having a vacuum gauge 204 for controlling the amount of vacuum applied to the flask 262 through the vacuum tube 210. Filtering the CBD oil mixture 160 through the nanofilters 202 produces a filtered CBD oil mixture 260.

Next, at block 118, the solution is collected and placed in a roto-recumbler homogenizer for about 45 minutes. Next, in some embodiments, at block 120, the solution is transferred to a biological safety cabinet and fitted with electrical probes into the solution for the purpose of charging the solution with an energy field of 12 volts (V) at about 44.1 Hertz (Hz) with a rapid discharge of about 12 seconds at about 12 second intervals (12 seconds on; 12 seconds off). In other embodiments, the solution is charged with an energy field of 12 V at about 24.1 Hz for a rapid discharge of about 15 seconds at between about 15 to 30 second intervals (15 seconds on; 15-30 seconds off), the homogenizer is set to run for 45 minutes and will run for 15 then stop for 15 seconds. In some embodiments, the homogenizer is configured to process less than or equal to 1L of material. In other embodiments, the homogenizer is configured to process greater than 1L of material.

Next, at block 122, the solution is then run through stages of the filtration system 200 to further reduce the particle size on the nm scale. In these embodiments, the filters reduce the particle size from 650 nm to 600 nm. The next filter stage reduces the particles from 500 nm to 540 nm. The next filter stage reduces the particles from 540 nm to 480 nm. The next filter stage reduces the particles from 480 nm to 440 nm. The next filter stage reduces the particles from 440 nm to 400 nm. The next filter stage reduces the particles from 400 nm to 375 nm. The next filter stage reduces the particles from 375 nm to 330 nm. The next filter stage reduces the particles from 330 nm to 300 nm. The next filter stage reduces the particles from 300 nm to 280 nm. The next filter stage reduces the particles from 280 nm to 217 nm. The next filter stage reduces the particles from 217 nm to 180 nm. The next filter stage reduces the particles from 180 nm to 150 nm. The next filter stage reduces the particles from 150 nm to 120 nm. And a final stage of the filter reduces the particles from 120 nm to 110 nm. In other embodiments, and optional block 126, the filter stages used are 160 nm, 140 nm, 112 nm, 85 nm, 54 nm, and finally to 44 nm. In other embodiments, other filter sizes are within the scope of the present disclosure.

Figure 4:
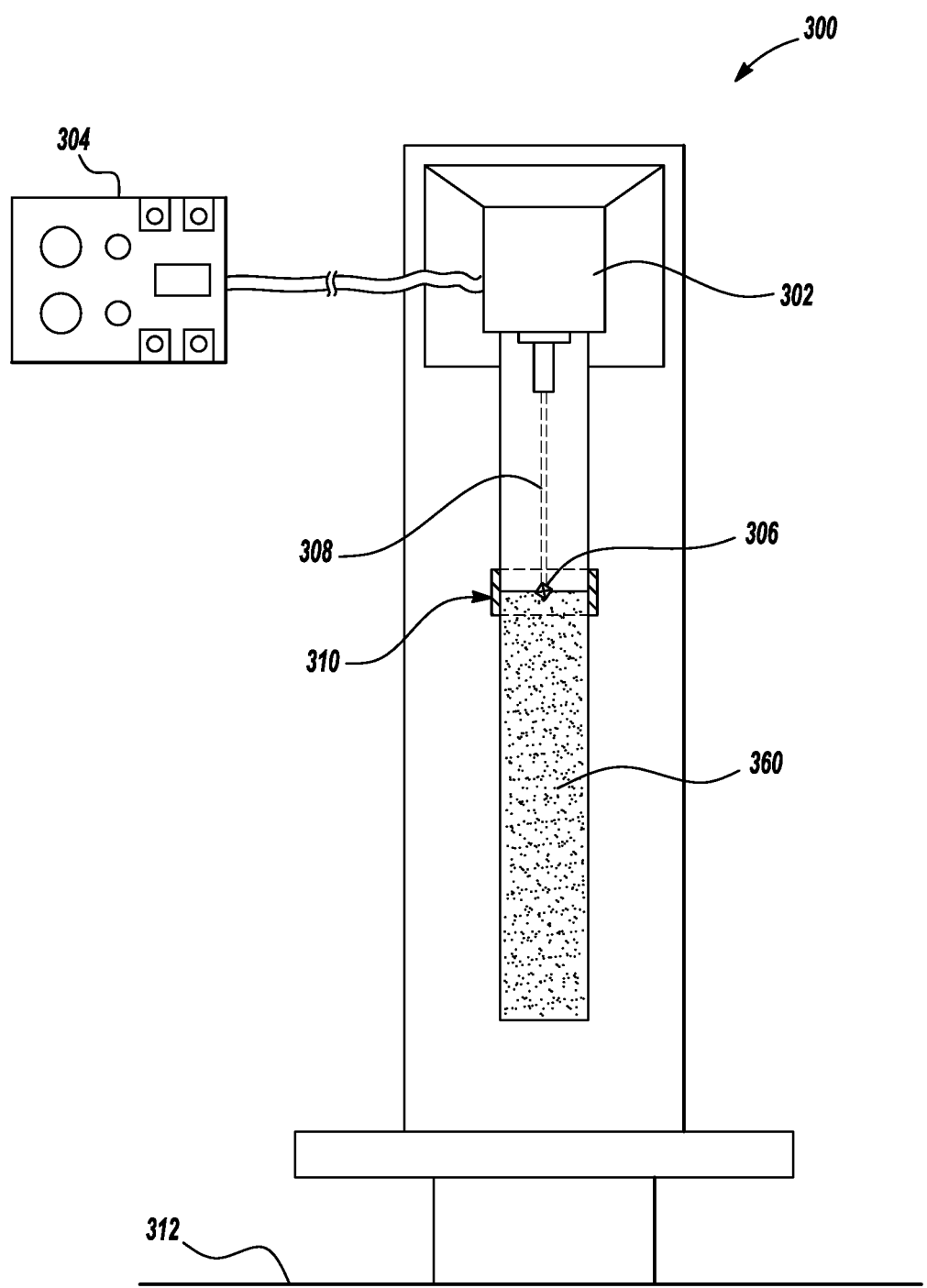
FIG. 4 is a view of a representative embodiment of a chamber having a laser and a laser effector of block 124 of FIG. 1.

After the CBD oil is reduced to 44 nm at block 122, at block 124, and referring to FIG. 4, a laser system 300 on a stand 312 includes a photon laser 302 traveling through a glass tube 310 and generating a pulse generated photon laser lumen beam 308, which is produced by a multiphase oscillator 304 and introduced to the filtered CBD oil 360. The beam travels through a laser effector 306. In some embodiments, the laser effector 306 is a pink sapphire cut into a 15 equal side faceted crystal which is double stacked in a 2.3 cm cylindrical chamber. In other embodiments, the laser effector 306 is an opulence half dome bubble lens to refract the beam. In some embodiments, the chamber is mirrored. In other embodiments, the steps at block 124 and block 122 are reversed.

In some embodiments, the opulence half dome bubble lens is a Planoconvex form lens sourced from Knight Optical (Unit 4 & 6, Roebuck Business Park, Ashford Rd, Harrietsham, Maidstone ME17 1AB, UK), with lens part number LPV7267-C. Such a lens has a material specification of N-BK7, a radius of curvature on the convex side of 152.4 mm+/−0.25 mm, an edge thickness of 8.46 mm+/−0.25 mm, a diameter of 50.8 mm+/−0.1 mm, a clear aperture percentage of 90%, a ground edge finish, a protective chamfer, a polished substrate scratch/dig value of 60/40, and no coating. In other embodiments, the laser effector 306 is any suitable lens or crystal.

In some embodiments, the glass tube 310 has a material of borosilicate, outer diameter of 100 mm+/−1.50 mm, wall thickness of 2.5 mm+/−0.20 mm, length of 101.6 mm or 304.8 mm. In other embodiments, the glass tube 310 has an inner diameter of 50.8 mm and a length of 101.6 mm or 304.8 mm. In other embodiments, the glass tube 310 is multiple portions of glass tube assembled together such that the half dome bubble lens may be suitably placed between the glass tube portions. In other embodiments, the glass tube 310 is any suitable material, size, or number of portions.

In some embodiments, the photon laser 302 is a 100 mW output power thermo-electrically cooled blue laser sourced from World Star Tech (185 Konrad Crescent, Markham, ON L3R 8T9, Canada), with a laser part number of TECBL-100G-405. Such a laser has a wavelength specification of 404 nm+/−5 nm, an optical output power of 100 mW with <1% stability, <0.5% RMS noise, an elliptical and collimated beam pattern, an operating voltage of 3.3 V DC, an operating current of <0.7 A, a constant current control circuit, and an operating temperature of 10° C. to 40° C.

During use of the laser system 300, when light passes through the filtered CBD oil 360, energy from the laser beam 308 is used to promote an electron from a bonding or non-bonding orbital into one of the empty anti-bonding orbitals of the CBD molecule. Each wavelength of light has an energy level associated with it. If the energy is sufficient to cause the aforementioned electron energy jumps, then that wavelength will be absorbed, and the energy will have been used in promoting the electron. An absorption spectrometer works in a range from about 200 nm (in the near ultra-violet) to about 800 nm (in the near infra-red). Only a limited number of the possible electron jumps absorb light in such a region. As such, the wavelength and power will change depending on what type of absorptions are be targeted.

In another embodiment of the methods disclosed herein, the following supplies are used, but are not limited to:
  10L Whole Plant Hemp CO2 Extract
  100L MCT Oil Or Equivalent Carrier Oil
  Magnetic Hot Plate Stirrer
  Homogenizer/Sonicator
  Class B Biological Safety Cabinet
  UV Lighting
  Air Shower Clean Room For Single Person
  Multiple Stainless Steel Tables
  300 ml-500 ml Open Bottle Funnel Fritted Base Filtration Unit
  1 L Flasks
  500 ml Flasks
  500 ml Beakers
  250 ml Beakers
  47 mm Nano Filters: 160 um; 140 um; 112 um; 85 um; 54 um; and 44 um
  13 mm BTL Stopper
  20 mm Aluminum Seals
  30 ml blt
  10 ml blt
  5 ml blt
  2 oz Dropper blt
  Isopropyl Alcohol In the further embodiment of the present disclosure, the following process is used. First, CBD oil mixture is heated until stabilized on heat source for 45 minutes in oil concentration to equal desired milligrams per 1 mL, while the magnetic mixer is in the solution. In one example, 100 mL of carrier oil mixed with 30 mL of industrial hemp oil into a narrow chamber flask. Then the mixture is placed onto magnetic hot plate mixer and gradually raise to 275° F. for 45 minutes. In some embodiments, the heat is reduced to 225° F. for 8 minutes, then reduced to 170° F. for 6 minutes, and then reduced to 155° F. and then stabilized for 6 minutes. In other embodiments, the heat is reduced gradually from 275° F. to 155° F. In one aspect, heat is used during the mixing process to activate the cannabinoids and allows the carrier and CBD oils to blend. The heat process prepares the mixture for the step of homogenization.

Next, the mixture is homogenized by placing the mixture into in sonicator homogenizer for 45 minutes to charge the solution with energy field of 12 volts at 24.1 hertz for a rapid discharge of 15 seconds with 15-30 second stops intermediately. Using the ultrasonic homogenizer, the particles of the liquid are reduced such that they become uniformly small and evenly distributed. The liquids are exposed to intense ultrasonic sound waves that propagate through the liquid causing alternating high-pressure and low-pressure cycles, allowing the particles to reduce uniformly.

Next, the mixture is filtered by repeated filtration in a system. Reducing the mixture to nanoparticles, progressing down using 47 mm mesh filters of 160 nm, 140 nm, 112 nm, 85 nm, 54 nm, and 44 nm. Filtrating the mixture using the above steps will remove impurities and will ensure the desired size of the molecules.

Next, the mixture is placed into biological safety cabinet for sterilization to ensure the product is sanitary.

In the processes of the present disclosure, the energy that is transferred to the CBD oil enhances the efficacy by charging the CBD oil with the energy from the vibrations, electricity, heat, and light.

In the processes of the present disclosure, it is desirable to keep all the molecules at the highest integrity such that the deliverance of them through the body is optimal. When dealing with the plant extract, and the wide spectrum of cannabinoids, some may be used to treat specific conditions, since the human body has an endo-cannabinoid system; however, in most humans, the system is depleted. The depletion may have been caused by removal of hemp products from the human diet. In the past, hemp seeds and other parts of the plant were used not only as nutrients but also medicinally. This formula supports that a light induced, nano-sized hemp (partial or the whole plant) derivative using specific mixture of cannabinoids, will be used in the body for health and well-being. The present disclosure provides a light enhanced cannabinoid rich extract, which increases the bio availability. Light has the ability to ionize cells to change the configuration.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A method of applying energy to CBD, comprising; obtaining CBD oil from a plant; combining the CBD oil with a carrier oil; heating the combination of the CBD oil and the carrier oil; mixing the combination of the CBD oil and the carrier oil; filtering the combination of the CBD oil and the carrier oil to a size of 60 nm or less; and applying a laser beam to the combination of the CBD oil and the carrier oil through a laser effector such that an electron is promoted from a bonding or non-bonding orbital into an empty anti-bonding orbital of the CBD molecule.

2. The method of claim 1, wherein the CBD oil and carrier oil are heated to about 275° F. for about 45 minutes.

3. The method of claim 1, wherein the step of mixing the CBD oil and carrier oil is performed for about 108 minutes.

4. The method of claim 1, wherein after the step of mixing, the CBD oil and carrier oil is placed in a sonicator for about 45 minutes.

5. The method claim 1, wherein the CBD oil and carrier oil is filtered to about 110 nm.

6. The method of claim 1, wherein the CBD oil and carrier oil is filtered to about 44.1 nm.

7. The method of claim 1, further comprising applying an energy field of 12 V at about 44.1 Hz for rapid discharge of about 12 seconds at about 12 second intervals.

8. The method of claim 1, further comprising applying an energy field of 12 V at about 24.1 Hz for rapid discharge of about 15 seconds at between about 15 and 30 second intervals.

9. The method of claim 1, wherein the step of applying the laser beam to the CBD oil and carrier oil includes applying a pulse generated photon laser lumen beam through a multiphase oscillator and through the laser effector.

10. The method of claim 9, wherein the laser effector is a pink sapphire cut into a 15 equal side faceted crystal, double-stacked in a 2.3 cm cylindrical chamber.

11. The method of claim 9, wherein the laser effector is an opulence half dome bubble lens configured to refract the beam.

12. A method of applying energy to CBD, comprising: obtaining CBD oil from a plant; combining the CBD oil with a carrier oil to produce a combination oil; heating the combination oil on a hot plate mixer to about 275° F. for about 45 minutes; reducing the heat of the combination oil to about 155° F. for about 45 minutes; mixing the combination oil for a total of about 108 minutes; heating the combination oil to about 275° F.; placing the combination oil in a sonicator for about 45 minutes; filtering the combination oil from about 800 nm to about 650 nm; placing the combination oil in a roto-recumbler homogenizer for about 45 minutes; applying an energy field of 12 V at about 44.1 Hz for a rapid discharge of about 12 seconds at about 12 second intervals; filtering the combination oil from about 650 nm to about 110 nm; and applying a pulse generated photon laser lumen beam through a multiphase oscillator and through a laser effector such that an electron is promoted from a bonding or non-bonding orbital into an empty anti-bonding orbital of the CBD molecule.

13. The method of claim 12, further including the step of filtering the combination oil from about 110 nm to about 44.1 nm or less.

14. The method of claim 12, wherein the laser effector is a pink sapphire cut into a 15 equal side faceted crystal, double-stacked in a 2.3 cm cylindrical chamber.

15. The method of claim 12, wherein the laser effector is an opulence half dome bubble lens configured to refract the beam.

\* \* \* \* \*